United States Patent
Hidaka et al.

(10) Patent No.: US 10,880,130 B1
(45) Date of Patent: Dec. 29, 2020

(54) SERDES EQUALIZATION FOR SHORT, REFLECTIVE CHANNELS

(71) Applicant: CREDO TECHNOLOGY GROUP LIMITED, Grand Cayman (KY)

(72) Inventors: Yasuo Hidaka, Cupertino, CA (US); Junqing (Phil) Sun, Fremont, CA (US)

(73) Assignee: CREDO TECHNOLOGY GROUP LIMITED, Grand Cayman (KY)

( * ) Notice: Subject to any disclaimer, the term of this patent is extended or adjusted under 35 U.S.C. 154(b) by 0 days.

(21) Appl. No.: 16/834,866

(22) Filed: Mar. 30, 2020

(51) Int. Cl.
*H04L 25/03* (2006.01)
*H04L 25/02* (2006.01)

(52) U.S. Cl.
CPC .... *H04L 25/03057* (2013.01); *H04L 25/0278* (2013.01)

(58) Field of Classification Search
CPC .............. H04L 25/03057; H04L 25/0278
See application file for complete search history.

(56) References Cited

U.S. PATENT DOCUMENTS

| | | | |
|---|---|---|---|
| 8,301,036 B2 | 10/2012 | He | |
| 9,071,479 B2 | 6/2015 | Qian et al. | |
| 9,385,859 B2 | 7/2016 | Kuan et al. | |
| 9,397,623 B1* | 7/2016 | Lacroix | H04L 25/03885 |
| 9,935,800 B1 | 4/2018 | He | |
| 10,212,268 B1 | 2/2019 | Sun | |
| 2006/0088089 A1* | 4/2006 | Gondi | H04L 25/03885 |
| | | | 375/232 |
| 2013/0343400 A1 | 12/2013 | Lusted et al. | |
| 2014/0086264 A1 | 3/2014 | Lusted et al. | |
| 2014/0146833 A1 | 5/2014 | Lusted et al. | |
| 2015/0003505 A1 | 1/2015 | Lusted et al. | |
| 2015/0146766 A1* | 5/2015 | Longo | H04L 25/03885 |
| | | | 375/219 |
| 2015/0256364 A1* | 9/2015 | Mobin | H04L 25/03057 |
| | | | 375/233 |
| 2016/0337114 A1 | 11/2016 | Baden et al. | |
| 2017/0257273 A1* | 9/2017 | Li | H04L 41/0803 |
| 2020/0076651 A1 | 3/2020 | Sun et al. | |

OTHER PUBLICATIONS

Non-Final Office Action dated Jul. 9, 2020 for U.S. Appl. No. 16/552,927.

(Continued)

*Primary Examiner* — Jaison Joseph
(74) *Attorney, Agent, or Firm* — Ramey & Schwaller LLP; Daniel Krueger (57) ABSTRACT

An illustrative short, high-rate communications link includes a serializer that provides a signal having a symbol rate of at least 10 GHz; and a deserializer that receives the signal via a printed circuit board ("PCB") trace coupled to the serializer with a first impedance mismatch and coupled to the deserializer with a second impedance mismatch. At least one of the serializer and deserializer includes an equalizer that attenuates a frequency component of the signal at half of the symbol rate relative to a frequency component of the signal at one third of the symbol rate. Though such attenuation may reduce signal-to-noise ratio, an improved communications performance may nevertheless be achieved by suppression of signal reflections.

20 Claims, 4 Drawing Sheets

(56) References Cited

OTHER PUBLICATIONS

Information Technology—Open Systems Interconnection Basic Reference Model: The Basic Model, 1994.
International Search Report dated Dec. 6, 2017 in International Application No. PCT/CN2017/075961.
Non-Final Office Action dated Jan. 24, 2018 in U.S. Appl. No. 15/487,045.
Reed-Solomon Forward Error Correction (RS-FEC) Sublayer for 100GBASE-R PHYs.
Notice of Allowance dated Jun. 8, 2018 in U.S. Appl. No. 15/487,045.
"Physical Coding Sublayer (PCS) for 64B/66B, type 50GBASE-R" Draft Amendment to IEEE Std 802.3-2015, Feb. 3, 2017, pp. 132-141, 10 pgs.
"Physical Medium Attachment (PMA) sublayer, Physical Medium Dependent (PMD) sublayer, and baseband medium, type 1000GBASE-KP4," IEEE Standard for Ethernet, Section Six, pp. 481-519, 39 pgs.
"Physical Medium Dependent (PMD) sublayer and baseband medium, type 50GBASE-CR, 100GBASE-CR2, and 200GBASE-CR4," Draft Amendment to IEEE Std 802.3-2015, Feb. 3, 2017, pp. 184-215, 32 pgs.
"Reed-Solomon Forward Error Correction (RS-FEC) sublayer for 50GBASE-R PHYs," Draft Amendment to IEEE Std 802.3-2015, Feb. 3, 2017, pp. 142-159, 18 pgs.

* cited by examiner

SERDES EQUALIZATION FOR SHORT, REFLECTIVE CHANNELS

CROSS-REFERENCE TO RELATED APPLICATIONS

The present application relates to U.S. application Ser. No. 16/691,523, titled "A multi-function signal measurement circuit for ADC-based SerDes" and filed 2019 Nov. 21 by inventor Junqing Sun; and to U.S. application Ser. No. 16/552,927, titled "SerDes pre-equalizer having adaptable preset coefficient registers" and filed 2019 Aug. 27 by inventors Junqing Sun and Haoli Qian. Both of these applications are hereby incorporated herein by reference in their entirety.

BACKGROUND

Digital communications occur between sending and receiving devices over an intermediate communications medium, or "channel" (e.g., optical fibers, insulated wires, printed circuit board ("PCB") traces). Each sending device typically transmits symbols at a fixed symbol rate, while each receiving device detects a (potentially corrupted) sequence of symbols from which the transmitted data is reconstructed. A "symbol" is a state or significant condition of the channel that persists for a fixed period of time, called a "symbol interval". A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by sequences of two or more symbols.

Many digital communication links use only one bit per symbol; a binary '0' is represented by one symbol (e.g., an electrical voltage or current signal within a first range), and binary '1' by another symbol (e.g., an electrical voltage or current signal within a second range), but higher-order signal constellations are known and frequently used. In 4-level pulse amplitude modulation ("PAM4"), each symbol interval may carry any one of four symbols, denoted as −3, −1, +1, and +3. Two binary bits can thus be represented by each symbol.

Channel non-idealities produce dispersion which may cause each symbol to perturb its neighboring symbols, a consequence known as inter-symbol interference ("ISI"). ISI can make it difficult for the receiving device to determine which symbols were sent in each interval, particularly when such ISI is combined with additive noise. The effects of channel dispersion and ISI become increasing severe as symbol rates are pushed ever higher. To combat noise and ISI, transmitting and receiving devices may employ various equalization techniques including linear equalizers and decision feedback equalizers.

Serializer/Deserializer ("SerDes") blocks are functional modules that convert between (lower rate) parallel symbol streams and (higher rate) serial symbol streams. Integrated circuits often incorporate SerDes blocks to reduce the number of physical input/output ("I/O") pins and/or external signal lines needed for communication. SerDes blocks are generally designed to operate at the highest possible symbol rates to maximize their benefit, and accordingly they are the modules that most benefit from the use of efficient equalization techniques.

Figure 1A:
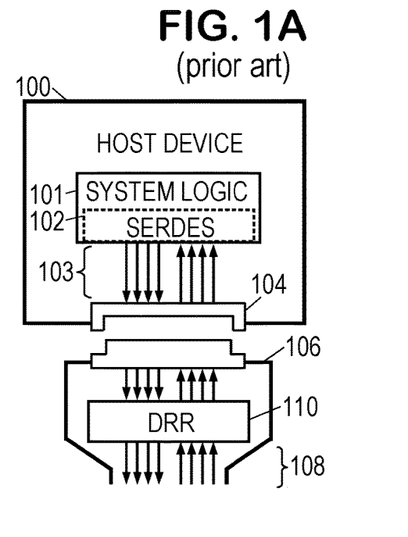
FIG. 1A is a block diagram of a network interface port in a host device.

FIG. 1A is a block diagram of a host device 100 such as, e.g., a server, storage device, switch, or router. One or more packaged integrated circuit chips 101 are interconnected by traces on a printed circuit board ("PCB") to implement the intended operations for the device. At least one of the chips 101 includes SerDes blocks 102 for high-rate digital communications. A set of PCB traces 103 couples the SerDes blocks 102 to an external port connector 104. The external port connector 104 may be designed to mate with a standard-compliant network interface module 106 such as a Quad Small Form-factor Pluggable Double Density ("QSFP-DD") module. To drive and equalize the communication signals across cable conductors or optical fibers 108, the network interface module 106 may include a Data Recovery and Remodulation ("DRR") device 110.

Figure 1B:
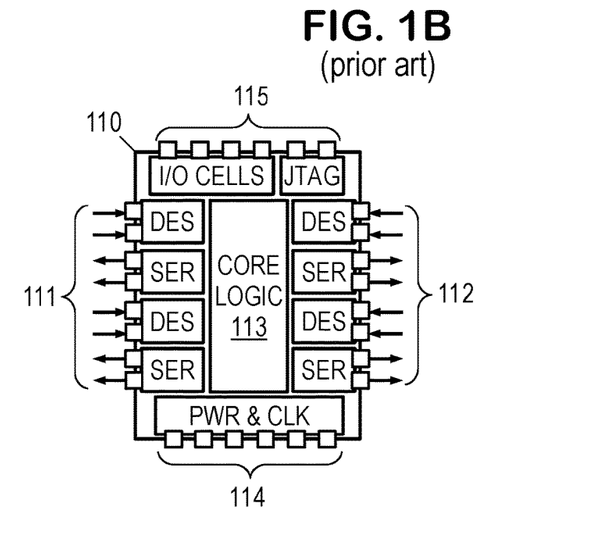
FIG. 1B is a block diagram of a data recovery and remodulation device.

FIG. 1B is a block diagram of an illustrative DRR device 110. Illustrative device 110 includes SerDes modules with pins 111 for exchanging high-rate serial bitstreams with the host device 100 across four lanes, pins 112 for sending and receiving high-rate serial bitstreams via the cable conductors 108, and core logic 113 for implementing a channel communications protocol and first-in first-out buffering of the bitstreams in each direction. The core logic 113 may include a programmable processor and associated firmware configuring the processor to provide the desired functionality.

Also included are various supporting modules and contacts 114, 115, such as power regulation and distribution, clock generation, digital input/output lines for control, and a JTAG module for built-in self testing. The chip designer can design the device by placing the predefined modular units for the serializers, deserializers, power, clock generator, I/O cells, and JTAG; and routing the interconnections between the modular units with a bit of supporting logic.

The deserializer blocks implement the receiving function of the host 100 and DRR device 110, including any suitable equalization technique, e.g., linear equalization and decision feedback equalization (DFE). The serializer blocks implement the transmission function of the host 100 and DRR device 110, optionally including spectral shaping or "pre-equalization" to at least partially compensate for channel dispersion. The SerDes blocks for the cable-facing lanes 112 are expected to cope with longer channels (say, a meter long or more) having a significant degree of attenuation and dispersion, and in practice, each of the SerDes blocks may be designed to cope such channels as a "worst case" scenario.

Figure 2A:
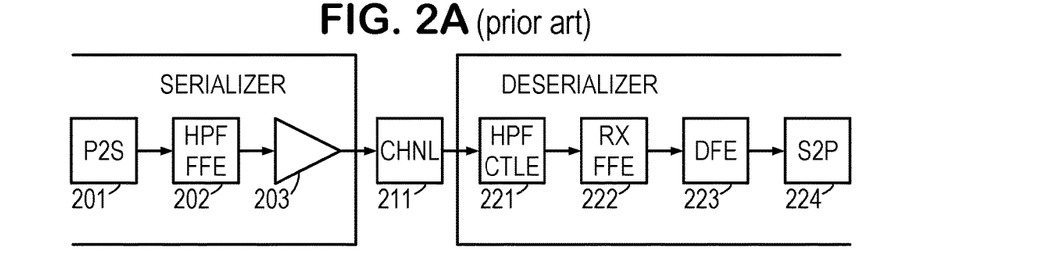
FIG. 2A is a block diagram of a prior art serializer-deserializer ("SerDes") communication link.

FIG. 2A shows a serializer communicating to a deserializer via a signal transmission channel 211. The serializer includes a parallel-to-serial ("P2S") converter 201, a pre-equalizer 202, and a transmit driver 203. The P2S converter 201 converts a parallel set of data symbol streams into a serial data symbol stream, e.g., by time multiplexing the parallel set onto a single signal line. The channel 211 typically exhibits dielectric loss and skin effects that preferentially attenuate the higher-frequency components of the transmitted signals. To partially counteract this effect, the pre-equalizer 202 is a linear equalizer, sometimes called a feed-forward equalizer ("FFE"), configured as a high-pass filter ("HPF") to boost the high-frequency components of the transmit signal. The transmit driver 203 supplies the filtered transmit signal to the channel 211.

At the far end of the channel 211, a continuous time linear equalizer ("CTLE") 221 is configured as another HPF or a band pass filter to further boost the high frequency components of the receive signal. A receiver FFE 222 and a decision feedback equalizer ("DFE") 223 operate to minimize ISI and perform symbol detection. (The receiver FFE 222 and DFE 223 may be implemented in the digital domain, preceded by an analog-to-digital converter.) A serial to parallel ("S2P") converter 224 converts the serial data stream into the parallel set of data symbol streams originally received by the serializer. Though shown as a separate block, the S2P functionality may be implemented at least in part by parallelization of the equalizer blocks 222, 223. Additional implementation detail for the equalizers can be found in, e.g., U.S. application Ser. No. 16/552,927, titled "SerDes pre-equalizer having adaptable preset coefficient registers" and filed 2019 Aug. 27 by inventors Junqing Sun and Haoli Qian.

Figure 2B:
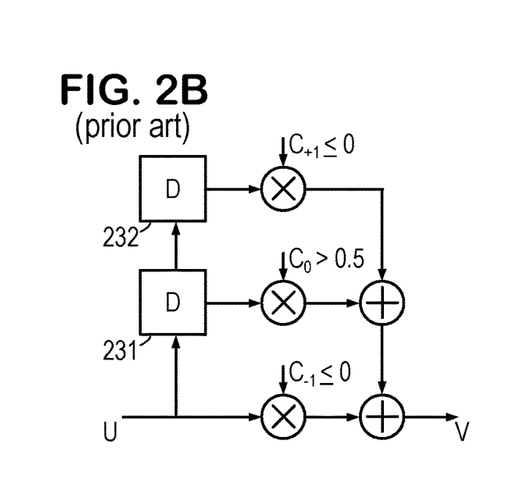
FIG. 2B is a block diagram of a prior art digital domain pre-equalizer.

FIG. 2B shows an illustrative pre-equalizer 202 implemented as a digital filter having delay elements 231, 232, which sequentially delay an input signal by one and two symbol intervals, respectively. Three multipliers scale the input signal, the once-delayed input signal, and the twice-delayed input signals with respective coefficients $C_{-1}$, $C_0$, $C_1$. The multiplied signals are then summed to form an output signal V.

One of the coefficients ($C_0$) at or near the center of the delay chain is the "cursor" coefficient having the largest value. In FIG. 2B, the cursor coefficient $C_0$ is labeled as being greater than 0.5. Typically, the cursor coefficient is normalized (set equal to unity), but it can take on other values for implementation convenience. The illustrative pre-equalizer includes one pre-cursor coefficient ($C_{-1}$) and one post-cursor coefficient ($C_1$), both of which are set less than or equal to zero to boost the high frequency signal components as needed to combat the channel response's high-frequency attenuation effects.

Figure 2C:
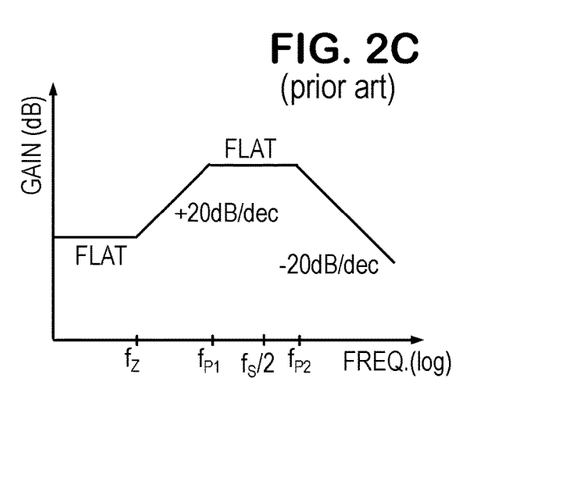
FIG. 2C shows an approximate frequency response of a prior art continuous time linear equalizer ("CTLE").

FIG. 2C shows an (approximate) frequency response of the CTLE 221. CTLE 221 may be designed to implement transfer function having a ratio-of-polynomials form in the Laplace transform domain. The numerator polynomial has at least one zero at frequency $f_Z$, causing the magnitude of the frequency response to increase at a rate of 20 dB per decade for higher frequencies. To prevent excessive noise amplification at frequencies above the range of interest, the denominator polynomial of the Laplace transform has two zeros (which, because they are in the denominator, are "poles"), shown here as frequencies $f_{P1}$ and $f_{P2}$, to counteract and then suppress the magnitude of the frequency response for frequencies above the Nyquist frequency (i.e., half of transmitted signal's symbol rate $f_S$). Using standard filter design techniques, the zero and pole frequencies can be adjusted to tailor the CTLE response to provide the desired amount and range of high frequency boosting.

The CTLE frequency response, as well as the coefficients of the pre-equalizer, receiver FFE, and DFE, are preset based on the expected channel response and/or adapted during use to optimize performance. When the SerDes blocks are mass manufactured, the preset coefficients and/or initial settings for adaptation are chosen based in part on "worst-case" scenarios to ensure performance over the widest possible range. Resolution and range of the programmable/adaptable parameter values are often limited, in part because suboptimal equalizer performance can generally be tolerated on higher-quality channels, and in part because smaller "configuration spaces" enable more efficient hardware implementation and operation.

For these reasons, certain standards (such as the IEEE Standard for Ethernet, IEEE Std 802.3-2015) may set channel specifications and may correspondingly limit the ranges of allowable coefficient values for, e.g., the post-cursor coefficient. The authors have discovered that high-rate SerDes blocks designed with such channel assumptions and parameter limits exhibit inadequate performance on certain low loss channels.

SUMMARY

Accordingly, there is provided herein a technique for correcting such unexpectedly poor equalization performance on reflective low-loss channels. One illustrative embodiment of a short, high-rate communications link includes a serializer that provides a signal having a symbol rate of at least 10 GHz; and a deserializer that receives the signal via a printed circuit board ("PCB") trace coupled to the serializer with a first impedance mismatch and coupled to the deserializer with a second impedance mismatch. At least one of the serializer and deserializer includes an equalizer that attenuates a frequency component of the signal at half of the symbol rate relative to a frequency component of the signal at one third of the symbol rate.

An illustrative serializer embodiment includes: a pre-equalizer that produces a filtered data stream having a symbol rate of at least 10 GHz, the filtered data stream having a frequency component at half of the symbol rate that the pre-equalizer attenuates relative to a frequency component at one third of the symbol rate; and a driver that converts the filtered data stream into a transmit signal.

An illustrative deserializer embodiment includes: at least one of a continuous time linear equalizer and a digital domain linear equalizer to convert a received signal into an equalized signal; a detector that converts the equalized signal into a symbol stream; and a controller that combines the equalized signal with the symbol stream or with a predetermined training sequence to evaluate a channel reflection strength. If the channel reflection strength exceeds a threshold, the controller enables artificial attenuation of a frequency component of the received signal at half of the symbol rate relative to a received signal frequency component at one third of the symbol rate.

An illustrative communications method embodiment includes: coupling a communication channel to convey a signal from a serializer to a deserializer, the signal having a symbol rate of at least 10 GHz; characterizing a reflection strength in the communication channel; and configuring the serializer to attenuate or boost a frequency component of the signal at half of the symbol rate relative to a frequency component at one third of the symbol rate based on whether the reflection strength exceeds a predetermined threshold.

Each of the foregoing embodiments may be implemented individually or conjointly, together with any one or more of the following optional features in any suitable combination: 1. a length of the PCB trace is between 2.5 cm and 25 cm. 2. the first impedance mismatch is a connection of the PCB trace to a packaged integrated circuit chip that includes the serializer and the second impedance mismatch is a connection of the PCB trace to a connector mating with a standard-compliant network interface module such as a Quad Small Form-factor Pluggable Double Density ("QSFP-DD") module that includes the deserializer. 3. the equalizer is a digital domain pre-equalizer having a post-cursor coefficient ($C_1$) greater than a magnitude of a pre-cursor coefficient ($C_{-1}$). 4. the equalizer is a digital domain pre-equalizer having a post-cursor coefficient ($C_1$) greater than an alternate-polarity sum of the pre-equalizer's pre-cursor coefficients: $\Sigma_{i<0}(-1)^i c_i$. 5. the deserializer includes a decision feedback equalizer that at least partially compensates for trailing intersymbol interference caused by the post-cursor coefficient. 6. the equalizer is a continuous time linear equalizer. 7. the controller enables the artificial attenuation by adjusting a pole frequency of the continuous time linear equalizer. 8. the controller enables the artificial attenuation by adjusting a post-cursor coefficient of the digital domain linear equalizer. 9. the controller enables the artificial attenuation by providing backchannel information to a source of the received signal, the backchannel information adjusting a post-cursor coefficient of a pre-equalizer at the source. 10. the controller enables the artificial attenuation by reducing a transmit driver bandwidth. 11. configuring the deserializer to also attenuate or boost the frequency component at the half of symbol rate based on whether the reflection strength exceeds the predetermined threshold.

DETAILED DESCRIPTION

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

While the manufacturing processes for electronic devices vary widely, they typically involve the use of printed circuit boards ("PCBs") to interconnect packaged integrated circuit chips with each other and with the various mechanisms for interacting with their users and environments. The chips have contacts that are soldered to corresponding contacts on the PCB. These connections create an impedance mismatch for signals conveyed by PCB traces to or from the chips. These impedance mismatches are normally insignificant in the frequency ranges used by most electronic devices, but serializer-deserializer (SerDes) communication links are pushing symbol rates to 10 GHz or higher where such impedance mismatches can cause significant reflections and attenuation.

Figure 3:
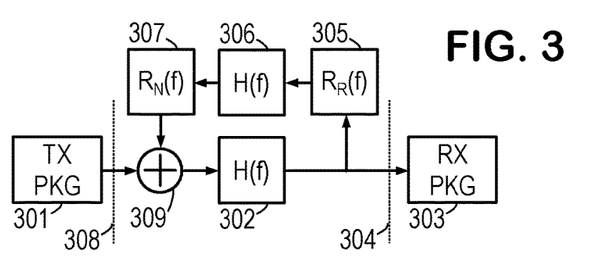
FIG. 3 is a block diagram of a reflective low-loss channel model.

FIG. 3 shows a model of an illustrative channel representing a short, low-loss path coupling a transmitting chip 301 to a receiving chip 303, such as a PCB trace connecting a network interface port to the packaged chip(s) of a host device. Block 302 represents the frequency-domain transfer function of the PCB trace. Where the PCB trace connects to the receiving chip 303, an impedance mismatch 304 causes some of the signal energy to reflect. Block 305 represents the frequency domain remote reflection function $R_R(f)$. The reflection traverses the PCB trace in the reverse direction as represented by block 306 until it encounters the impedance mismatch 308 at the connection to the transmitting chip 301. Block 307 represents the frequency domain near reflection function $R_N(f)$. The near reflection combines with the original signal as represented by summation node 309. In combination, the model relates the received signal $Y(f)$ to the transmitted signal $X(f)$ as:

$$Y(f) = \frac{H(f)}{1 - H^2(f)R_R(f)R_N(f)} X(f)$$

The impedance mismatches may be characterized as parasitic capacitances or inductances that preferentially reflect the higher-frequency signal components. The PCB trace might typically have a length in the range between 2.5 cm and 25 cm, with a low-loss channel transfer function $H(f)$ which does not sufficiently attenuate the strength of the reflected signal components despite their multiple traversals of the trace. The travel time associated with the reflections can cause their ISI effects to fall outside the range of any feasible equalization filters, leading to a surprisingly poor equalization performance that would be exacerbated by high-pass filter style equalizers. As an example, the authors have observed that a 5 cm PCB trace connecting a host device chip to a pluggable module connector may have an insertion loss below 6 dB at the Nyquist frequency, as compared with a Nyquist frequency insertion loss greater than 14 dB for a 23 cm trace. Though the shorter channel has a smaller loss, the bit error ratio ("BER") performance of the SerDes blocks may be significantly worse due to the strong reflections.

Figure 4:
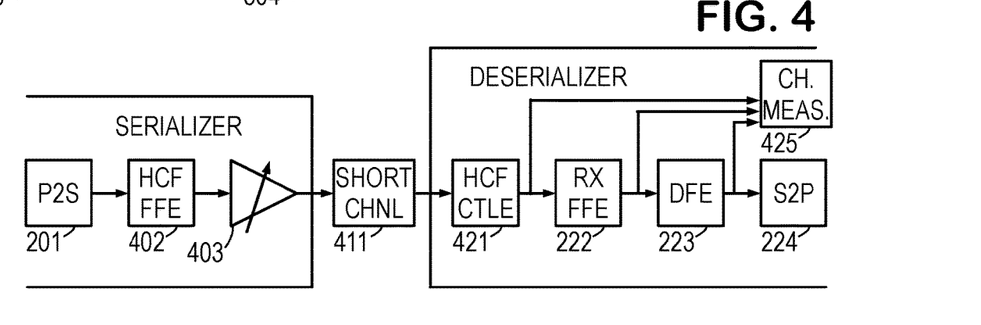
FIG. 4 is a block diagram of an illustrative SerDes communication link embodiment.

FIG. 4 shows an illustrative SerDes communications link having a reflective low-loss channel 411. The high-pass filter pre-equalizer 202 of the prior art is replaced by a high-cut filter pre-equalizer 402 to artificially suppress, rather than boost, the high-frequency components of the transmitted (and hence of the received) signal. Alternatively, or in addition, the high-pass filter CTLE 221 of the prior art is replaced by a high-cut filter CTLE 421, also acting to artificially suppress rather than boost the high-frequency components of the received signal. As yet another alternative or addition, the receiver FFE 222 can be configured to operate as a high-cut filter. As still yet another alternative or addition, transmit driver 203 may be replaced by a transmit driver 403 having a configurable bandwidth that is reduced as needed to adequately attenuate the high-frequency components of the signal.

Though such suppression actually worsens the signal-to-noise ratio ("SNR") of the received signal, it attenuates the reflection-induced ISI that would fall outside the equalization capabilities of the DFE 223, reproducing the attenuation effect of a longer PCB trace. As with the longer traces, the attenuated high-frequency signal component is recovered by DFE which operates by subtracting estimated distortion based on recently received data values without amplifying the high-frequency noise.

Alternatively, the DFE 223 may be replaced with another type of detector that has a capability to detect a symbol from signal with attenuated frequency component at the half of symbol rate such as a Maximum Likelihood Sequence Detector (MLSD) or a Viterbi detector.

A channel characterization block 425 combines the symbol stream (produced by the DFE 223) with an equalized signal from the CTLE 421 and/or from the receiver FFE 222 to measure characteristics of the channel. One suitable implementation of the channel characterization block can be found in co-pending application Ser. No. 16/691,523, titled "A multi-function signal measurement circuit for ADC-based SerDes", which has been incorporated by reference herein. Other implementations are contemplated, including conventional training controllers and filter coefficient adaptation modules. The channel characterization block 425 can determine whether the received signal includes "echoes" indicative of strong reflections. The reflections may be considered "strong" when the measured signal amplitude is simply relatively large compared to the possible range of signal amplitude allowed by the specification (e.g., greater than a threshold such as, say, 50% of the maximum signal amplitude), or the measured raw BER is relatively high compared to the desired BER (e.g., greater than a threshold such as, say, $10^{-4}$, $10^{-5}$, or $10^{-6}$). When such strong reflections are detected, the channel characterization block 425 can switch the pre-equalizer, CTLE, or receiver FFE from a high pass filter (high frequency boosting) behavior to a high cut filter (high frequency attenuating) behavior.

Figure 5A:
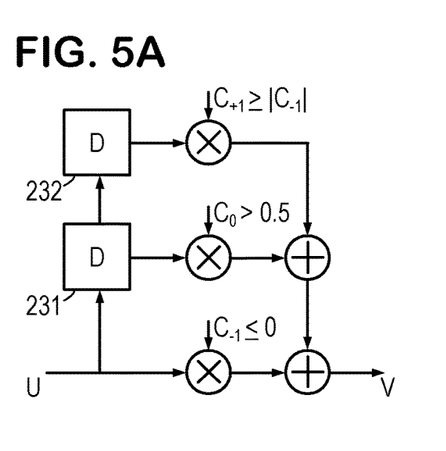
FIGS. 5A-5B are illustrative pre-equalizers configured to attenuate a signal frequency component at the half of the symbol rate.
Figure 5B:
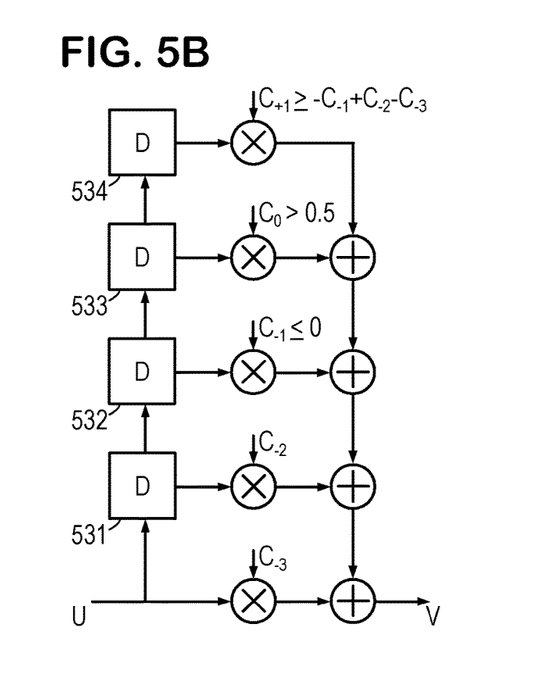

FIG. 5A is a block diagram of an illustrative 3-tap FFE (usable as a digital domain pre-equalizer or receiver FFE) configured as a high-cut filter. Though the transfer function of the FFE can be manipulated in various ways, we believe it to be particularly advantageous to implement a high-cut filter characteristic by setting the post-cursor tap coefficient ($C_1$) value to be larger than the magnitude of the (negative) pre-cursor tap coefficient ($C_{-1}$), because the DFE can readily compensate for the post-cursor ISI introduced in this fashion. For a longer FFE, such as the 5-tap FFE shown in FIG. 5B, the high cut filter characteristic can be provided by setting the post-cursor tap coefficient ($C_1$) value to be larger than the alternate-polarity sum of the pre-equalizer's pre-cursor coefficients: $\Sigma_{i<0}(-1)^i C_i$. Again, the DFE can readily compensate for the post-cursor ISI. We note here that the illustrated FFEs can be switched between high pass filter (high frequency boosting) and high cut filter (high frequency attenuating) behavior by enabling the post-cursor tap coefficient to change from a value less than $|C_{-1}|$ (or for the longer filters, less than the alternate polarity sum) to a value greater than this amount.

Figure 6:
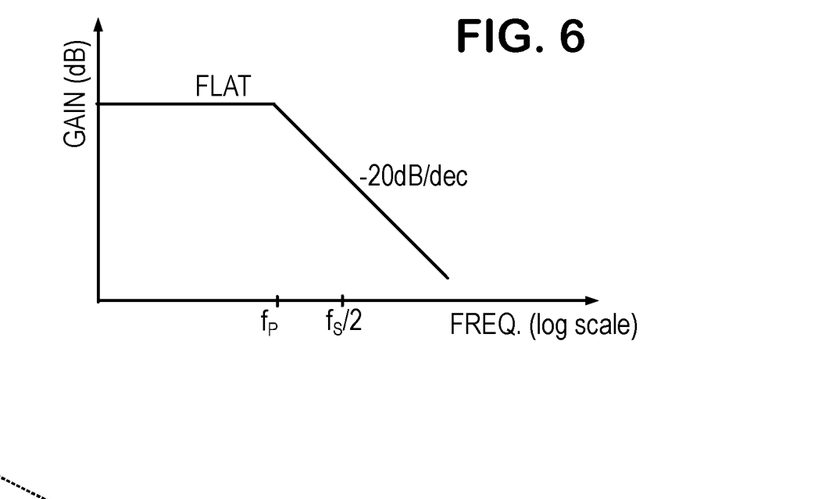
FIG. 6 shows an approximate frequency response of an illustrative CTLE configured to attenuate a signal frequency component at the half of the symbol rate.

FIG. 6 is a graph of an (approximate) frequency response of the high cut filter CTLE 421. To attenuate signal components near and above the Nyquist frequency (i.e., half of the symbol rate $f_S$), the frequency response has one or more poles at or below the Nyquist frequency $f_S/2$. The frequency response is essentially flat below the first pole frequency $f_P$, and if only one pole is used, the response has a negative −20 dB/dec slope above $f_P$, acting to suppress the signal frequency components at and above the Nyquist frequency $f_S/2$. CTLE implementations with tunable zero and pole frequencies can be found in the open literature. If, for example, high pass filter CTLE 221 implements the response of FIG. 2B with a tunable zero frequency $f_Z$ location, the $f_Z$ can be tuned to essentially coincide with one of the pole frequencies (e.g., $f_{P2}$), causing their effects to cancel and yielding the response shown in FIG. 6.

Figure 7:
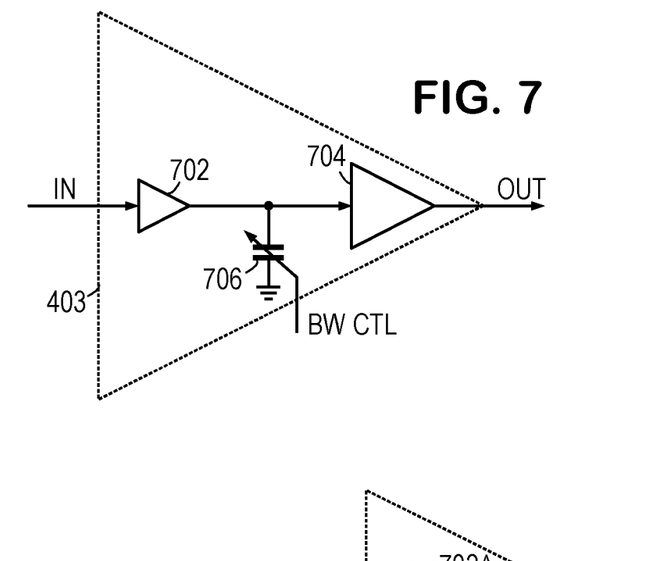
FIG. 7 is an illustrative transmit driver embodiment having adjustable bandwidth.

FIG. 7 shows an illustrative transmit driver 403 having a configurable bandwidth. Driver 403 includes an input amplifier 702 (also termed a "pre-driver") coupled to an output amplifier 704 (also termed a "final driver"). To controllably reduce the bandwidth of the driver 403, the electrical connection between the (current-limited) input amplifier 702 and output amplifier 704 is loaded with an adjustable capacitance 706. The capacitance 706 acts as a low pass filter, reducing the maximum slew rate of the signal. Increasing the capacitance further reduces the signal slew rate, reducing the low pass filter bandwidth by lowering the cutoff frequency.

Figure 8:
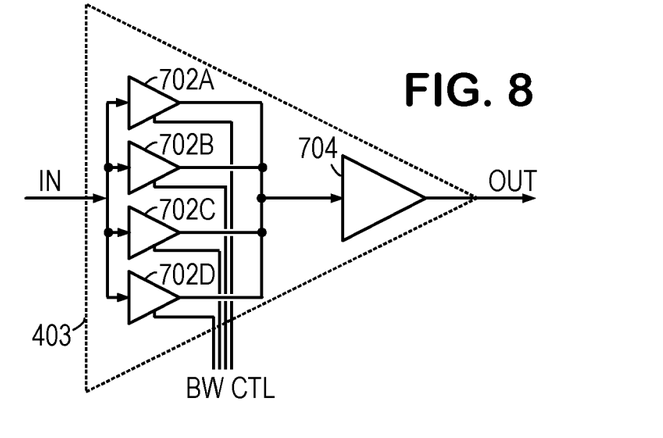
FIG. 8 is a second illustrative transmit driver embodiment having adjustable bandwidth.

FIG. 8 shows an alternative embodiment of a transmit driver 403 having a configurable bandwidth. It includes multiple input amplifiers 702A-702D arranged in parallel to drive the output amplifier 704. Rather than varying the input capacitance of the final amplifier 704, the embodiment of FIG. 8 disables one or more of the input amplifiers to further limit the current supplied to the final amplifier 704, thereby reducing the maximum slew rate of the signal. The transmit driver bandwidth is determined by the number (and size) of the enabled input amplifiers, with fewer enabled input amplifiers lowering the cutoff frequency and thereby reducing the bandwidth of the low pass filter.

Figure 9A:
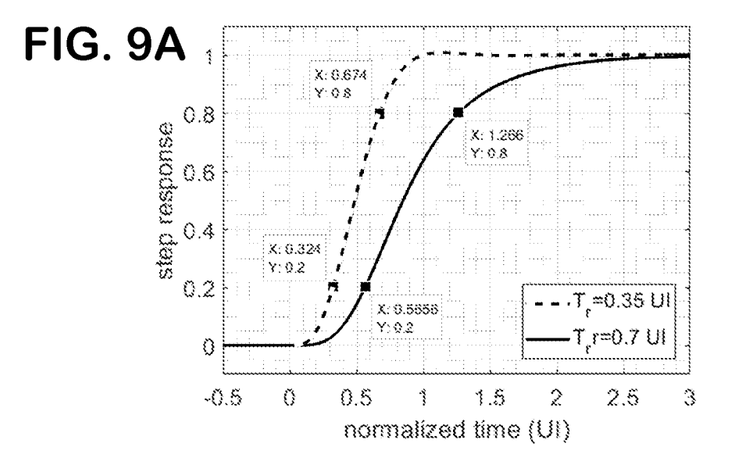
FIGS. 9A-9B are a graphs comparing responses of a transmit driver configured for different bandwidths.

FIG. 9A is a graph comparing step responses of a transmit driver configured with a nominal bandwidth (dashed line) and one with a reduced bandwidth (solid line) to attenuate the frequency components at half of the symbol rate. The respective rise times Tr (as measured by the delay between the 20% and 80% levels of the step response) are 0.35 and 0.70 symbol intervals, respectively. The nominal bandwidth configuration enables a full zero-to-one symbol transition to occur within a single interval, whereas the reduced bandwidth design doubles the rise time and substantially lengthens the time required for a full transition.

Figure 9B:
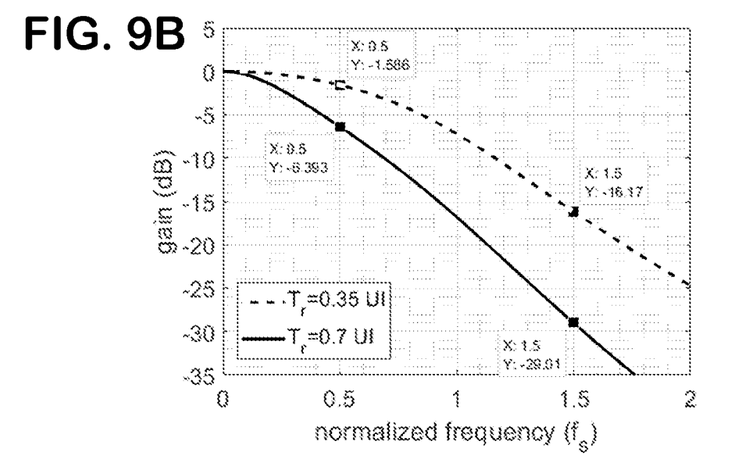

FIG. 9B is a graph comparing the corresponding frequency-domain gain curves for the transmit drivers with the nominal and reduced bandwidth configurations. At the Nyquist frequency, the nominal configuration has less than 2 dB of attenuation, whereas the reduced bandwidth configuration provides over 6 dB of attenuation.

Figure 10:
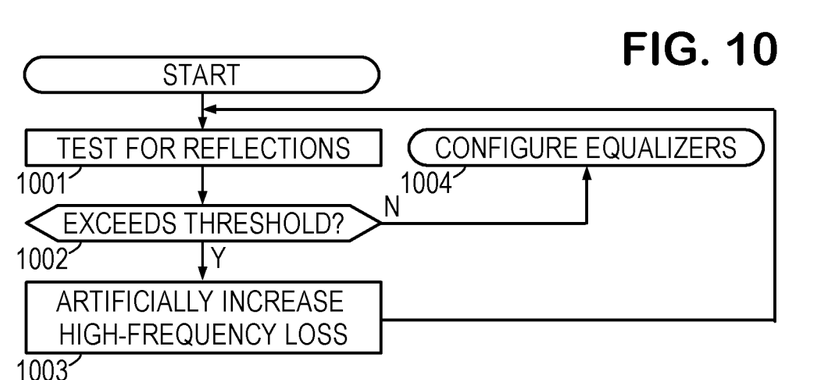
FIG. 10 is a flow diagram of an illustrative communications method accounting for reflective low-loss channels.

FIG. 10 is a flow diagram of an illustrative communications method which may be implemented by test equipment at the factory or by the channel characterization block 425 in the field. In block 1001, the channel response is evaluated to measure the strength of reflections. For example, the channel characterization block 425 may determine the presence of strong echoes in the received signal by measuring post-cursor ISI outside the range of the DFE, possibly in combination with adaptation of the filter parameters to optimize performance. The adaptation of the filter parameters may be constrained as needed to provide any high-frequency suppression determined to be necessary.

In block 1002, the reflection strength is evaluated, e.g., by comparison of the ISI with a predetermined threshold representing a desired BER. If the reflection strength exceeds the threshold, then in block 1003, the method artificially increases high frequency attenuation, e.g., by increasing the value of the post-cursor tap coefficient ($C_1$), tuning the pole and zero positions of the CTLE, and/or reducing the bandwidth of the transmit driver. Block 1003 may be performed iteratively, with gradual increases to the post-cursor tap coefficient, gradual adjustments to the CTLE parameters, and/or gradual reductions to the transmit driver bandwidth, until the reflection strength is adequately suppressed. Once the reflection strength falls below the threshold, the method proceeds in block 1004 with storing the filter parameters in firmware or otherwise finalizing the configuration of the SerDes equalizers.

The foregoing embodiments may resolve SerDes performance issues on reflective, low-loss channels by adding artificial insertion loss that attenuates the high-frequency component of the signal as well as the high-frequency component of the reflection noise. The attenuated high-frequency component of signal is recoverable by DFE. This attenuation can be implemented by modifying existing equalizers (e.g., the pre-equalizer, the transmit driver, the CTLE, or the receiver FFE) to implement high cut filter behaviors.

Numerous alternative forms, equivalents, and modifications will become apparent to those skilled in the art once the above disclosure is fully appreciated. For example, the pre-equalizer or receiver FFE may have additional pre-cursor and post-cursor taps, with modifications to the response implemented using any known filter design techniques. It is intended that the claims be interpreted to embrace all such alternative forms, equivalents, and modifications that are encompassed in the scope of the appended claims.

What is claimed is:

1. A short, high-rate communications link that comprises:
    a serializer that provides a signal having a symbol rate of at least 10 GHz; and
    a deserializer that receives the signal via a printed circuit board ("PCB") trace, the PCB trace being coupled to the serializer with a first impedance mismatch and coupled to the deserializer with a second impedance mismatch, the deserializer operating to convert the signal into a symbol stream,
    at least one of the serializer and deserializer including an equalizer that attenuates a frequency component of the signal at half of the symbol rate relative to a frequency component of the signal at one third of the symbol rate.

2. The communications link of claim 1, wherein a length of the PCB trace is between 2.5 cm and 25 cm, and wherein the first impedance mismatch is a connection of the PCB trace to a packaged integrated circuit chip that includes the serializer and the second impedance mismatch is a connection of the PCB trace to a connector mating with a network interface module that includes the deserializer.

3. The communications link of claim 1, wherein the equalizer is a digital domain pre-equalizer having a post-cursor coefficient ($C_1$) greater than a magnitude of a pre-cursor coefficient ($C_{-1}$).

4. The communications link of claim 1, wherein the equalizer is a digital domain pre-equalizer having a post-cursor coefficient ($C_1$) greater than an alternate-polarity sum of the pre-equalizer's pre-cursor coefficients: $\Sigma_{i<0}(-1)^i C_i$.

5. The communications link of claim 4, wherein the deserializer includes a decision feedback equalizer that at least partially compensates for trailing intersymbol interference caused by the post-cursor coefficient.

6. The communications link of claim 1, wherein the equalizer is a continuous time linear equalizer.

7. A serializer that comprises:
    a pre-equalizer that produces a filtered data stream having a symbol rate of at least 10 GHz, the filtered data stream having a frequency component at the half of the symbol rate that the pre-equalizer attenuates relative to a frequency component at one third of the symbol rate; and
    a driver that converts the filtered data stream into a transmit signal.

8. The serializer of claim 7, wherein the pre-equalizer is a digital domain filter having a post-cursor coefficient ($C_1$) greater than a magnitude of a pre-cursor coefficient ($C_{-1}$).

9. The serializer of claim 7, wherein the pre-equalizer is a digital domain filter having a post-cursor coefficient ($C_1$) greater than an alternate-polarity sum of the pre-equalizer's pre-cursor coefficients: $\Sigma_{i<0}(-1)^i C_i$.

10. A deserializer that comprises:
    at least one of a continuous time linear equalizer and a digital domain linear equalizer to convert a received signal having a symbol rate of at least 10 GHz into an equalized signal with a frequency component at half of the symbol rate attenuated relative to a frequency component at one third of the symbol rate;
    a decision feedback equalizer that converts the equalized signal into a symbol stream; and
    a controller that combines the equalized signal with the symbol stream or with a predetermined training sequence to evaluate a channel reflection strength and, if the channel reflection strength exceeds a threshold, to enable artificial attenuation of a frequency component of the received signal at half of the symbol rate relative to a received signal frequency component at one third of the symbol rate.

11. The deserializer of claim 10, wherein the controller enables the artificial attenuation by adjusting a pole frequency of the continuous time linear equalizer.

12. The deserializer of claim 10, wherein the controller enables the artificial attenuation by adjusting a post-cursor coefficient of the digital domain linear equalizer.

13. The deserializer of claim 10, wherein the controller enables the artificial attenuation by providing backchannel information to a source of the received signal, the backchannel information adjusting a post-cursor coefficient of a pre-equalizer at the source.

14. The deserializer of claim 10, wherein the controller enables the artificial attenuation by reducing a bandwidth of a transmit driver.

15. A communications method that comprises:
    providing a communication channel to convey a signal from a serializer to a deserializer, the signal having a symbol rate of at least 10 GHz;
    characterizing a reflection strength in the communication channel; and
    configuring the serializer to attenuate or boost a frequency component of the signal at half of the symbol rate relative to a frequency component at one third of the symbol rate based on whether the reflection strength exceeds a predetermined threshold.

16. The communications method of claim 15, further comprising configuring the deserializer to also attenuate or boost the frequency component at half of the symbol rate based on whether the reflection strength exceeds the predetermined threshold.

17. The communications method of claim 16, wherein said configuring the deserializer includes reducing a pole frequency of a continuous time linear equalizer if the reflection strength exceeds the threshold.

18. The communications method of claim 17, wherein said configuring the deserializer includes making a post-cursor coefficient of a digital domain linear equalizer greater than an alternate-polarity sum of the equalizer's pre-cursor coefficients: $\Sigma_{i<0}(-1)^i C_i$.

19. The communications method of claim 15, wherein said configuring the serializer includes making a post-cursor coefficient of a digital domain linear equalizer greater than an alternate-polarity sum of the equalizer's pre-cursor coefficients: $\Sigma_{i<0}(-1)^i C_i$.

20. The communications method of claim 15, wherein said configuring the serializer includes adjusting a bandwidth of a transmit driver.

\* \* \* \* \*